REGENERATION OF SPENT ETCHANT

Original Filed Oct. 12, 1971

United States Patent Office 3,785,950

Patented Jan. 15, 1974

3,785,950

REGENERATION OF SPENT ETCHANT

Emerson H. Newton, 39 Virginia Road, Arlington, Mass. 02175; John M. Ketteringham, Concord Road, Lincoln, Mass. 01773; John L. Sienczyk, 50 Williams St., Arlington, Mass. 02175; and Calvin M. Isaacson, 2 Oceanside Drive, Beverly, Mass. 01915

Original application Oct. 12, 1971, Ser. No. 188,189. Divided and this application May 19, 1972, Ser. No. 254,895

Int. Cl. B01k 3/00; C22d 1/02

U.S. Cl. 204—239 8 Claims

ABSTRACT OF THE DISCLOSURE

The invention relates to a process for extracting copper as metal from a used etchant solution containing complexed cupric ions as an oxidant while simultaneously regenerating the etchant for further use. The etchant treated may have a pH from below 0 to 13, but preferably has a pH of at least 3 and more preferably has a pH between about 4 and 10. The process comprises electrowinning a portion of the copper from solution under conditions effective for electrowinning but not etching. These conditions include a substantial freedom from oxygen in the vicinity of the cathode, high current density, a substantial freedom from solution agitation during the winning operation and preferably for good efficiency, low solution temperature at the interface of the solution and the cathode, typically below 140° F. The process is economical because in the preferred embodiment, a portion only of the copper in solution is removed, the remaining copper being left in solution and available as a source of cupric ion for reuse of the etchant. The process is an important contribution to pollution abatement efforts as it eliminates the need for dumping copper and other wastes resulting from an etching operation.

This is a division of application Ser. No. 188,189, filed on Oct. 21, 1971.

BACKGROUND OF THE INVENTION

(1) Field of the invention

This invention relates to a process for recovering copper metal from an etchant containing complexed cupric ion as an oxidant and to a continuous etching process and apparatus for said process.

(2) Description of the prior art

Solutions of cupric ions and complexing agents have been used to dissolve metals, especially copper and copper alloys. This is desirable, for example, in place of ordinary machining in order to remove specified amounts of these metals from surfaces of fragile or perculiarly shaped objects. A more widespread application of this technique is the production of printed electrical circuits. In this application, a resist or mask in the form of the desired circuit is placed over a copper film laminated to a base, and the partially masked copper film is placed in contact with an etchant. The copper surface not covered by the resist is dissolved, while the copper covered by the resist remains to from the desired circuit pattern.

One such cupric etching solution is the well known, highly acidic cupric chloride solutions in hydrochloric acid. Another such etching solution is disclosed as a secondary etchant in U.S. No. 3,231,503. This patent teaches a primary etchant solution of a chlorite such as sodium chlorite in an alkaline solution containing an ammonium salt as a complexing agent for the metal stripped. The stripping solution is used at a pH of from 8 to 13 and preferably above pH 9. It is disclosed in said patent that the useful life of the stripping solution can be extended upon exhaustion of the primary oxidant; i.e., the chlorite by increasing the temperature to utilize dissolved copper in the cupric states as a secondary oxidant for further dissolution of copper converting the cupric copper to the cuprous form in the process. Consequently, at this stage of the etching operation, the etchant solution is a cupric ion-ammoniacal etchant as it comprises an ammonium chloride solution of cupric ion as the oxidant having a pH between about 9 and 13. The ammonia is the complexing agent holding copper in the solution.

An improved cupric ion type etching solution is disclosed in copending U.S. Pat. No. 3,650,958. This etchant is essentially a non-ammoniacal, non-fuming cupric etchant comprising a source of cupric ions, a non-fuming complexing agent to maintain said cupric ions and dissolved copper in solution preferably an amine complexing agent, capable of forming a solution as an oxidant as defined in the above said Pat. No. 3,650,958 which process is capable of continuous operation if desired, of pH dependent upon selection of the complexing agent, the etchant is preferably an essentially neutral etchant operating within a pH range of 7 to 8. The etchants of this application are believed to be an improvement over those of the aforesaid U.S. Pat. No. 3,231,503 because they are non-fuming, thereby avoiding noxious fumes and in addition, have the capability of operating within the preferred pH range of 7 to 8, and therefore, do not attack materials used in the manufacture of printed circuit boards such as resists and the like.

In use of the aforesaid etchants, the metal, e.g., copper is dissolved by one mole of the cupric ion oxidizing one mole of elemental copper to form two moles of cuprous ion. This continues until the rate of dissolution decreases to an unacceptable commercial level due to saturation with dissolved copper. As a result of high concentration of copper, the etching rate is substantially decreased and copper begins to precipitate from solution in a form believed to be either the oxide or hydroxide of copper. The precipitate fouls the etching equipment such as by clogging the spray heads in a spray etching apparatus.

The spent etchant cannot be discarded because of strict code regulations prohibiting dumping of materials which adversely affect the ecology. The dumping of copper, as an example, is generally prohibited. Moreover, dumping of the spent etchant is also economically undesirable because the etchant contains materials that have intrinsic value. For example, copper dissolved in solution has value as scrap metal or as raw material for preparation of fresh etchant. The complex for the copper is also of value and it would be highly desirable to recover and/or reuse this material.

Various methods have been proposed for treatment of spent etchant. For example, it has been proposed to vaporize the water and collect the solids. However, this method is uneconomical and the recovered solids have to be further treated to recover their components in useful form. Alternatively, it has been proposed to pass the etchant through cooling means to precipitate copper compounds from solution, remove the precipitate such as by filtration from the etchant, and recirculate the filtrate to the etching apparatus as fresh etchant. This method has certain desirable aspects as it is inexpensive and simple, but insufficient copper precipitates even at the low temperatures used so that the filtrate still contains a substantial amount of dissolved copper and the etching capacity of the recirculated etchant is not as high as might be desired. Further, the precipitate is in a form believed to be the oxide, hydroxide or some other salt of copper and as such, does not have the value that metallic copper would have. A further method proposed in the prior art for treating spent etchants, of the ammonium persulphate type rather than the type treated by the process disclosed herein, comprises electroplating all copper out of solution. This method is generally unacceptable because its object is to remove all copper to permit dumping. The cost of removing the last remaining parts of copper from solution is quite expensive and time consuming. Furthermore, the remaining persulphate may be destroyed to a degree by the process, thereby preventing full utilization of the remaining oxidant.

SUMMARY OF THE INVENTION

The process of the subject invention provides recovery of copper substantially as metal from the aforesaid etchant solutions especially the preferred etchants comprising complexed cupric ions as an oxidant as defined in the aforesaid U.S. Pat. No. 3,650,958 which process is capable of continuous operation if desired, is economical, provides copper substantially in metallic form and results in regeneration of the etchant in a form suitable for reuse, if desired.

The process of treating the etching solution comprises electrowinning a portion only of the copper from the solution under conditions favorable to electrowinning and unfavorable to etching. Electrowinning is herein defined as the electrolytic recovery of metal from solution. The conditions favoring electrowinning include a substantial freedom from oxygen in the vicinity of the cathode, a high current density, a substantial freedom from solution agitation during the treatment operation and preferably, a relatively low solution temperature at the interface of the solution and cathode, preferably below 140° F. in the vicinity of the cathode and at the interface of the cathode and the solution, the temperature may be as low as 90° F.

Since copper in cupric form is necessary in the regenerated etching solutions of this invention as an oxidant, preferably only a portion of the copper is removed by electrowinning. In contrast, where electrowinning procedures have been used for treatment of spent etchant in the prior art, substantially all of the copper is removed so that the remainder of the solution may be dumped. Thus, the process for regeneration in accordance with this invention is substantially less expensive than prior art process as less copper is removed and it is not necessary to remove low concentrations of copper from dilute solutions as would be necessary in the prior art.

In addition to the cost advantage, the process of this invention has the advantage that the treated solution may be reused after removal of copper by a minor replenishment and if necessary, oxidation of the cuprous ions in solution to the cupric form. This latter oxidation can be performed simply by bubbling air through the etchant solution or by using a spray etcher where aeration and hence oxidation will occur by spraying. Thus, the chemicals comprising the etching solution are not lost and there are no materials to dump. As a consequence, it is considered that the discovery described herein is a valuable contribution to the pollution abatement efforts.

DESCRIPTION OF THE PREFERRED EMBODIMENTS

Figure 1:
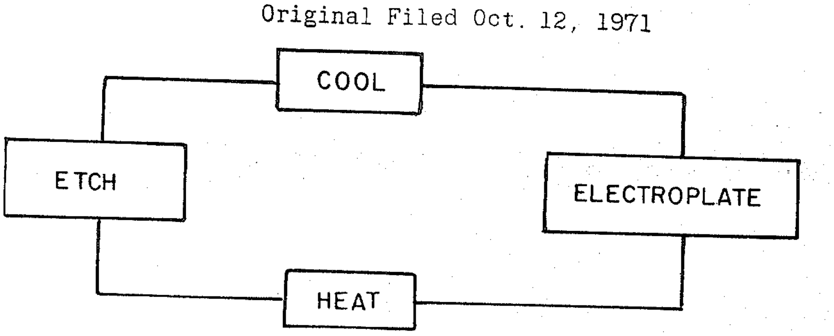
FIG. 1 is a schematic drawing of a continuous etching-etchant regeneration system.

The preferred etchants treated in accordance with this invention are those defined in the aforesaid U.S. Pat. No. 3,650,958 which etch in accordance with the following two reactions:

$$Cu^{++} + Cu^{\circ} \longrightarrow 2Cu^{+}$$

$$2Cu^{+} \xrightarrow{O_2} 2Cu^{++}$$

As presented above, one mole of the divalent copper oxidizes one mole of metallic copper to two moles of monovalent copper dissolved in solution. The monovalent copper is continuously reconverted to the divalent form by aeration such as by bubbling air through the solution or by use of a spray etcher. Thus, there is always sufficient divalent copper available in solution for continuous etching. The process continues until the total concentration of copper in solution exceeds that which can be solubilized in solution resulting in a slow-down of etching and precipitation of a copper salt. A complexing agent may be used to increase the solubility of copper in solution.

To make the etchant, substantially any cupric salt may be used as a source of the cupric ion. Typical cupric salts include, by way of example, cupric sulphate, cupric chloride, cupric nitrate, cupric acetate and the like. The amount of cupric ion initially in solution is not critical, may vary within broad limits, and to some extent, is dependent upon the quantity of complexing agent used. A preferred range comprises from about 5 to 10 ounces as cupric ion per gallon of solution and more preferably from about 6 to 8 ounces as cupric ion per gallon.

A complexing agent used in the make up of the preferred etchant serves an important function. It solubilizes sufficient cupric ion to permit etching and further to hold dissolved copper in solution. As copper is etched, its concentration builds in solution to the point where the capacity of the complexing agent to hold additional copper is used up and copper begins to precipitate from solution. In this respect, it should be noted that within the pH range of 4 to 13, cupric salts are fairly insoluble and insufficient cupric ion would be held in solution to provide a satisfactory etch rate without the complexing agent. Thus, increasing the concentration of the cupric ion beyond its normal solubility limit by means of the addition of the complexing agent permits addition of sufficient cupric ion to provide a satisfactory etch rate which is defined for purposes of commercial use at least 0.1 mil copper per minute with solution agitation.

The selection of the complexing agent is not critical. One complexing agent used in the prior art is ammonium hydroxide which forms a soluble complex with the copper at pH of about at least 8.2. However, the use of ammonium hydroxide as the complexing agent is least preferred because of the liberation of noxious ammonia fumes during etching, the resultant loss of this agent by fuming and the inability to form a copper complex at pH below about 8.2.

Preferably, the complexing agent used is one that is non-fuming so that it will not liberate appreciable ammonia fumes during the etching operation. Also, it should form the copper (II) complex with the cupric ion at the solution pH at which it is desired to use the etching solution. The complex formed with the cupric ion should dissociate in solution to an extent that permits etching of copper at a minimum rate of 0.1 mil per hour. In this respect, it should be readily apparent that the extent of dissociation of a complex is dependent upon numerous factors such as solution pH, solution temperature, concentration of various additives and the like. Thus, though a particular copper (II) complex may not dissociate to a sufficient extent under one set of operating conditions, it may dissociate sufficiently under a different set of operating conditions to provide a satisfactory etch rate. As a guideline only, the log of the stability constant ($K_1$) for a particular copper (II) complex should not exceed 18 and preferably should not exceed 12 at 25° C. Stability constants for a great number of copper (II) complexes are set forth in Martell, Stability Constants of Metal-Ion Complexes, Special Publication Number 17, Section II, The Chemical Society, London, 1964, incorporated herein by reference.

Preferred complexing agents heretofore used with cupric ion to form an etchant include alkanolamines such as monoethanolamine, diethanolamine, mono-isopropanolamine, and diisopropanolamine.

The amount of complexing agent used is in excess of that amount necessary to complex all of the cupric ion initially in solution, generally at least 1.5 times the amount necessary to complex all of the cupric ion and preferably, at least that amount capable of complexing 15 ounces of copper per gallon of solution. The excess is desirable so as to hold dissolved copper in solution after it is etched and then oxidized by air to the cupric form.

Ammonium ion in addition to the complexing agent is not required for the etchants to be operable, though it is desirable to add an ammonium salt as it acts as an exaltant for the etching rate and solubilizes the cuprous ion. Typical ammonium salts that may be used include ammonium carbonate, ammonium sulphate, ammonium chloride and the like. The amount of ammonium salt is not critical and may vary broadly from no addition to less than that amount which causes appreciable fuming during the etching operation. The preferred range comprises between 0.5 mole per liter to 5 moles per liter of solution and more preferably, from about 1 to 2 moles per liter of solution.

Chloride and/or bromide ions may be added to the preferred etchants either in the form of cupric or ammonium chloride or bromide or in any other convenient form as would be obvious to those skilled in the art such as sodium chloride or bromide. The function of this ion is not fully understood, but is believed to increase the etching rate, possibly by acting as a solubilizer for cuprous copper formed on the surface of a copper part being etched. The chloride or bromide ion may be present in minor amounts, the actual concentration not being critical. Preferably, it is present in solution in an amount of at least 0.1 mole per liter and more preferably in an amount of from 0.2 to 3.0 moles per liter. It appears that there may be a synergism between the ammonium and halide ions resulting in a substantially increased etching rate.

The preferred etchants may be used over a wide range of pH, typically from about 3 to 13. However, in the preferred embodiment, the etchants are used within the relatively neutral pH range of from about 4.0 to 10 and most preferably from about 7.0 to 8.0. The essentially neutral pH range is preferred to substantially reduce volatization of ammonia gas; because of the lack of attack on substrate materials, photo-masks, photoresists, and the like; ease of handling; and safety.

In the electrowinning apparatus, copper is plated out of solution on a cathode. The maximum amount of copper that can be removed theoretically is 0.042 ounce of copper per ampere-hour. Thus, the cathode efficiency of the overall process is expressed as a percentage based upon the amount of copper actually removed relative to the amount of copper that may be theoretically removed. Because copper is being removed from an etching solution, it would be expected that cathode efficiency would be low. However, it is an unexpected discovery of this invention that efficiencies of 90% or higher can be obtained by decreasing the etching potential of the etching solution. This is accomplished by a combination of procedures including one or more of avoiding solution agitation, reducing oxygen concentration in the vicinity of the cathode, applying a high current density and high electrical potential difference between the cathode surface and the solution and preferably by maintaining a relatively low solution temperature at least at the interface of the etching solution and cathode.

With regard to reducing the oxygen concentration in the cathode area, it should be understood that in the electrowinning process, oxygen is generated on the surface of the anode. It is this oxygen that preferably is kept out of the cathode area. This is readily accomplished by spacing the anodes at a suitable distance from the cathode while avoiding solution agitation, or by bagging the anodes. With regard to solution temperature, the entire etching solution may be cooled to obtain reasonably high cathode efficiency. However, the process is also operative at temperatures of 140° F., and higher. At these temperatures, cathode efficiency typically is in the order of about 40 to 50% or lower dependent upon temperature. From an economy standpoint, it is desirable to treat a hot solution so as to avoid cooling the hot solution prior to electrowinning and reheating the solution prior to etching. In one embodiment of this invention, by use of a cooled cathode as will be discussed in greater detail below, a hot solution may be treated to remove copper with high cathode efficiency and without the need for either cooling or heating the bulk of the etching solution. The reason for this is that the cooled cathode results in a lower temperature at the interface formed between the solution and cathode. It is an unexpected discovery of this invention that cathode efficiency is higher when a hot solution is treated using cooled cathode than when the entire etching solution is cooled.

The operating temperature of the etchant for etching is not critical. Satisfactory results are obtained with temperatures below normal ambient room temperatures to the boiling point of the etchant though it is generally desirable to maintain the temperature above room temperature, preferably between about 100° and 140° F. At the higher temperature, a fast etching rate is possible, thus increasing the number of available complexing agents useful for the purposes of this invention.

One embodiment of the invention for etching and regeneration is illustrated in FIG. 1 of the drawings which is a schematic representation of the process of the invention. In a batch operation, copper is etched in the etching apparatus 1 until the copper concentration in solution becomes too high for practical operation. The copper concentration at this point is dependent upon the materials comprising the etchant, but typical ranges between about 12 and 20 ounces of copper per gallon of solution and preferably between about 13 and 18 ounces of copper per gallon. When the copper reaches this level, the etchant is pumped to electro-winning apparatus 2.

In order to recover copper from the etching solution and prevent the etching solution from redissolving the removed cooper as well as attacking the materials of the apparatus, cooling means may be provided to decrease the temperature of the etchant and thereby reduce its etching potential. These cooling means may be external such as heat exchanger 3 or preferably internal in the apparatus such as by a cooled cathode as will be described in greater detail below. The cooled cathode is preferred so that the etching solution is coolest at that point where copper is plating out of solution while the remainder of the solution is not. This provides unexpectedly greater cathode efficiency and also, is more economical as the bulk of the solution need not be heated and cooled during the cycle.

The conditions within electrowinning apparatus 2 are dependent in part upon the composition of the etchant treated. In general, the current density may vary between about 75 and 400 amperes per square foot and higher (ASF) and preferably between about 100 and 250 ASF at sufficient applied voltage to maintain current density. In this current density range and at a total of 5 to 30 amperes per gallon, from about 0.1 to about 1 ounce of copper can be plated from a gallon of spent etchant per hour. For purposes of illustration only with the aforesaid conditions, copper can be plated out of a spent solution overnight with removal of about 50% or more of the copper so that the etchant can be made suitable for reuse the next morning.

Following electrowinning of the copper from the etchant, it is pumped back to etching apparatus 1. The etchant may be heated to operating temperature if necessary externally of the etching apparatus by passing it through heat exchanger 4 or heating elements may be contained within the etching apparatus 1 (not shown) or the heat supplied in the electrowinning step may be sufficient. At this point, the etchant is suitable for reuse with minor replenishment. With regard to replenishment, there is some loss in chemical through drag-out and fuming, especially where the etchant is operated at pH above 8 and uses ammonium hydroxide as the complexing agent for copper. Copper is converted to the cupric form by bubbling air through the etching apparatus and/or by aerial oxidation in a spray etching operation.

The above described process was based upon a batch operation. It should be understood that the process is also capable of continuous operation where a stream of etchant will be continuously passed from the etching apparatus to the plating apparatus for plate-out of copper and back to the etching apparatus. Conditions of temperature, etchant strength, current density and the like are adjusted so that the copper concentration is maintained within the optimum etching ranges such as between 4 and 10 ounces of copper per gallon.

In a lesser preferred embodiment of the invention, substantially all copper can be removed from solution for purposes of reclamation or disposal. The solution left may be mixed with spent etchant to make a fresh, usable etching solution.

Figure 2:
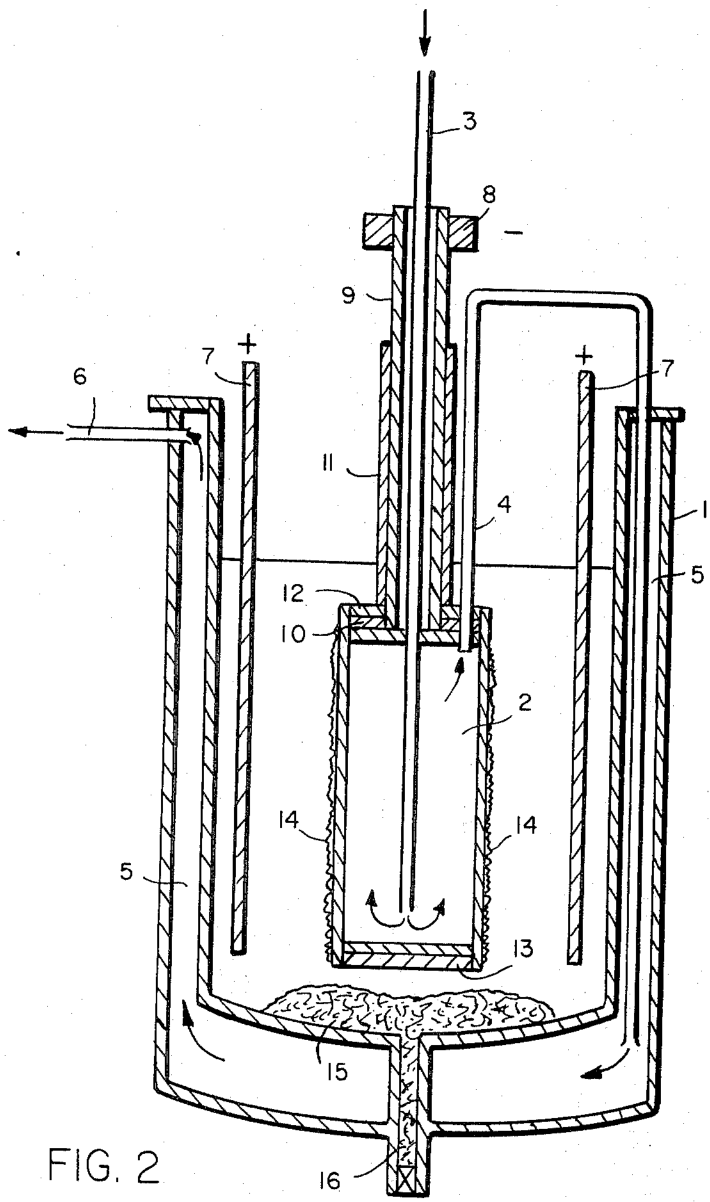
FIG. 2 is a sectional elevation view of an electrowinning apparatus.

FIG. 2 of the drawings is a cross-sectional representation of an apparatus suitable for plating copper from the spent etchant solution in accordance with the invention. The apparatus comprises a tank 1, which may be a doubled walled non-metallic tank such as a double walled polyethylene tank in combination with symmetrically spaced, chemically inert anodes. A cathode 2 is centrally located in tank 1, is preferably hollow to permit a flow of coolant therethrough and is of a corrosion resistant metal such as stainless steel. Coolant is supplied to cathode 2 by a pipe 3 extending through the length of the cathode and having an outlet at the bottom thereof. Coolant flows downward through pipe 3, upward through cathode 2 and leaves the cathode through outlet 4. This is a desirable configuration as it provides for localized cooling only in the cathode area while the remainder of the solution is not cooled. Therefore the etching potential is decreased in the cathode area. The solution is not appreciably cooled because the heat removed by cooling through the cathode is replaced by the passage of current through the solution. If desired, outlet 4 may be serially connected to cooling jacket 5 of tank 1, though in the preferred embodiment, this jacket is not necessary. The coolant emerges from jacket 5 through outlet 6. In combination with cathode 2 is preferably a plurality of anodes 7 of a non-dissolving, conductive material such as graphite symmetrically spaced around tank 2. Current is supplied to the electrodes by means of a rectifier (not shown) through copper bus bar 8 in contact with another bus bar 9 leading to copper plate 10 which feeds cathode 2. The copper bar 9 is insulated by insulation layer 11. The cathode is preferably also coated with insulation in those areas where plate-out is not desired. Thus, there would be insulation layers 12 and 13 at the top and bottom of cathode 2, respectively. In operation, a loose granular, denditric layer of copper 14 forms on the exposed metallic surface of the cathode 2. The copper layer is readily stripped from the cathode such as by a circular scraping blade (not shown) capable of sliding over the surface of cathode 2. The copper from the surface of cathode 2 settles on the bottom of the plating apparatus as a layer 15 where it may be removed through outlet 14 or collected in a basket (not shown). Surprisingly, the copper on the bottom of the plating tank is not dissolved by the etchant. This is believed to be due to the formation of a cuprous compound layer on the surface of the copper in the stagnant non-erated etchant which passivates the copper thus preventing dissolution. The copper may be removed from the plating apparatus continuously or at given desired intervals.

EXAMPLE 1

| | Pounds per gallon |
|---|---|
| Cupric chloride dihydrate [1] | 0.8 |
| Monoethanolamine | 1.3 |
| Ammonium salts [2] | 2.20 |
| Ammonium hydroxide | 0.20 |

Water to 1 gallon.

[1] Equivalent to 4.6 ounces cupric ion per gallon of solution.
[2] A combination of ammonium salts including ammonium chloride and ammonium nitrate.

Approximately 30 gallons of the above formulation are used to fill a spray etching apparatus and copper is etched from selected areas of copper laminated epoxy panels. The copper laminate used is one ounce panel, approximately 0.0013 inch thick. The etchant is used at a temperature varying between about 120° and 130° F. and at a pH of from about 7.2 to 7.8. The pH is adjusted from time to time with ammonium hydroxide solution. Copper is etched at a rate of about 1 ounce per 1½ minutes. When the total copper concentration reaches about 18 ounces per gallon, or 540 ounces total in the 30 gallons of etchant, etching is discontinued.

The spent etchant is pumped to a plating apparatus consisting of a polyethylene plating tank, 22 inches in diameter, 32 inches high and having a domed bottom with a centrally located outlet. A fixed cylindrical stainless steel cathode having an 8-inch diameter, 20-inch length and having an overall plating surface area of 500 square inches is inserted centrally within the plating tank. The ends of the cathode are coated with epoxy. Current is brought to the cathode through a 1-inch diameter copper bus bar and distributed through the cathode by copper plates welded to the cathode surface. The cathode is provided with a cooling water inlet and outlet. Ten graphite anodes measuring 1 inch by 5 inches and having a length of 34 inches are placed around the perimeter of the plating tank. Total working surface area of the anodes is about 1200 square inches. Current is supplied by a 750 ampere-12volt rectifier. The plating tank is equipped with connecting bus bars for anodes and cathodes, holders, fixtures, pumps, pipelines and associated equipment necessary to handle solutions and copper sludge.

The etching solution initially enters the apparatus at about 75° F. and no agitation is used in the plating tank. A current density of about 200 ASF is applied and copper plates out at a rate of about 0.6 ounce per gallon of solution per hour. Total plating time is about 16 hours and the total weight of copper plated from solution is about 288 ounces. The copper remaining in solution is about 8.4 ounces per gallon.

Following electrowinning of the copper, the etchant is pumped to the etching tank and replenished with small amounts of ammonium chloride and monoethanolamine. The etchant is then suitable for re-use.

The above procedure can be repeated through numerous cycles.

EXAMPLE 2

| | Grams |
|---|---|
| Cupric chloride dihydrate | 300 |
| Ammonium chloride | 30 |

Ammonium hydroxide to pH 9.
Water to 1 liter.

All tests were carried out with a gallon of solution contained in a 4-liter beaker. An outer ceramic crock acted as a water jack to cool the solution. The cathode was a type 321 thin-wall stainless steel tube, three-quarters of an inch in diameter and about eighteen inches long. A plating area of 12.8 square inches was provided by stopping off the tube at 5.43 inches from the lower end with vinyl tape. The end was closed with a rubber stopper and two plastic tubes in the other end were used to pass cooling water into and out of the cathode. The same cooling water was led into the cooling jacket around the beaker holding the electrolyte. Four anodes one-half inch by three-quarter inch by twelve inches were cut from Helx 1058 National Electrolytic Graphite and hung around the rim of the beaker equi-distant from the centrally located cathode to insure a uniform current density. The anode to cathode spacing was about two inches. Sufficient voltage was supplied to produce a constant current of 16 amperes resulting in a cathode current density of 1.25 amperes per square inch (ASI) and an anode current density of 0.27 ASI. The pH was measured at the start and finish of each run. Temperatures in the bath and the cooling jacket were measured periodically during an eight-hour run as well as the voltage across the cell. The cathode was inspected at intervals and the copper deposit scraped off if possible. The test conditions and results are given in the attached table:

Variable test conditions—Results

| | |
|---|---|
| Voltage range, start-finish | 3.5–3.1 |
| Bath temperature ° F., start-finish | 70–77 |
| Temperature in water jacket ° F., start-finish | 70–73 |
| pH, start-finish | 9.6–9.4 |
| Cu, oz./gal., start, by analysis | 14.3 |
| Cu, oz./gal., finish, by analysis | 9.7 |
| Cu removed, oz. by analysis | 4.6 |
| Rate of Cu removal, oz./gal./hr. by analysis | 0.58 |
| Percent efficiency of Cu removal, by analysis | 86.0 |
| Cu recovered from cathode, oz. | 4.2 |
| Rate of Cu recovery oz./gal. | 0.53 |
| Percent efficiency of Cu recovery | 78.5 |
| Type of deposit | Nodular |

The deposit was about sixteenth of an inch thick, very hard and somewhat adherent to the cathode surface, slightly rough and with vertical lines. It was removed with some difficulty, though this problem could be avoided by applying a thin veneer of a suitable polymer to the cathode surface such as Teflon, polystyrene and the like.

EXAMPLE 3

| | Grams |
|---|---|
| Cupric chloride dihydrate | 300 |
| Ammonium chloride | 30 |
| Tartaric acid | 150 |
| Ammonium nitrate | 50 |

Ammonium hydroxide to pH 6.5.
Water to 1 liter.

EXAMPLE 4

| | |
|---|---|
| Cupric chloride dihydrate (grams) | 300 |
| Hydrochloric acid (ml.) | 300 |

Water to 1 liter.
pH 7.0.

EXAMPLE 5

Ten ounces of copper were added to a proprietary etchant formulation identified as Q-Pex which comprises cupric chloride, ammonium hydroxide and a proprietary chelating agent with pH of about 10.2.

Using the apparatus and procedure of Example 2, the above formulations of Examples 3 through 5 were regenerated with test conditions and results as set forth in the following table:

| Example number | 3 | 4 | 5 |
|---|---|---|---|
| Variable test conditions—results: | | | |
| Voltage range, start-finish | 4.0-2.8 | 2.9-2.3 | 3.9-3.2 |
| Bath temperature, ° F., start-finish | 70-78 | 73-76 | 72-80 |
| Temperature in water jacket, ° F., start-finish | 70-73 | 72-72 | 70-73 |
| pH, start-finish | 6.9-6.7 | 0-0 | 10.2-9.1 |
| Cu, oz./gal., start, by analysis | 13.9 | 14.7 | 19.8 |
| Cu, oz./gal., finish, by analysis | 9.9 | 13.6 | 16.3 |
| Cu removed, oz., by analysis | 4.0 | 1.1 | 3.5 |
| Rate of Cu removal, oz./gal./hr., by analysis | 0.50 | 0.14 | 0.44 |
| Percent efficiency of Cu removal, by analysis | 75.0 | 20.6 | 65.5 |
| Cu recovered from cathode, oz. | 3.3 | 0.81 | 3.1 |
| Rate of Cu recovery, oz./gal | 0.41 | 0.10 | 0.39 |
| Percent efficiency of Cu recovery | 61.7 | 15.1 | 58.0 |
| Type of deposit | (1) | Nodular | Nodular |

[1] Dendritic.

The cupric chloride etchant (Example 4) could be regenerated, but efficiency was low. However, the results indicated that the etchant can be regenerated using this procedure even though the cost might be high due to low efficiency. Furthermore, the efficiency could be improved by optimization of test procedure.

EXAMPLE 6

The procedure of Example 1 is repeated with modification to make the process continuous. The modification comprises decreasing the size of the spray etching apparatus to ten gallons and maintaining a 30-gallon reservoir in the regeneration equipment. Etchant is continuously recirculated slowly from the etchant apparatus to the regeneration equipment at a rate of 5 gallons per hour. In this way, copper is continuously etched at the rate of two ounces per hour per gallon of solution and removed in the regeneration apparatus at about the same rate.

What is claimed is:

1. In combination, an apparatus for etching metal and an apparatus for electrowinning metal, and means for passing a solution therebetween, said apparatus for etching metal having aeration means and heating means and said apparatus for electrowinning metal having spaced electrodes within a plating tank, the cathode of said spaced electrodes being hollow and having means for passing a coolant therethrough.

2. The combination of claim 1 where said apparatus for etching metal is a spray etching or splash etching apparatus.

3. The combination of claim 1 where the cathode of said apparatus for electrowinning metal is provided with insulation on its top and bottom surfaces.

4. The combination of claim 1 where said apparatus for electrowinning metal has a means on said cathode removing metal from the surface thereof.

5. The combination of claim 4 where said means for removing metal from the surface of the cathode comprises a vibrator.

6. The combination of claim 4 where said means for removing metal comprises a thin polymer film over said cathode surface.

7. The combination of claim 1 where the anodes of said spaced electrodes in said electrowinning apparatus are of graphite.

8. The combination of claim 1 where said apparatus for electrowinning is provided with means for removal of metal therefrom.

References Cited

UNITED STATES PATENTS

| | | | |
|---|---|---|---|
| 3,470,044 | 9/1969 | Radimer | 204—151 X |
| 2,895,814 | 7/1959 | Clark | 204—224 R X |
| 1,982,009 | 11/1934 | McKinney et al. | 204—280 X |
| 2,748,071 | 5/1956 | Eisler | 204—130 X |

JOHN H. MACK, Primary Examiner

D. R. VALENTINE, Assistant Examiner

U.S. Cl. X.R.

204—274, 275, 284

PO-1050
(5/69)

UNITED STATES PATENT OFFICE
CERTIFICATE OF CORRECTION

Patent No. 3,785,950 Dated January 15, 1974

Inventor(s) Emerson H. Newton, John M. Ketteringham, John L. Sienczyk and Calvin M. Isaacson It is certified that error appears in the above-identified patent and that said Letters Patent are hereby corrected as shown below:

In the Heading of the patent, following the names of the inventors, insert Assignors to Shipley Company Inc., Newton, Mass.

Signed and sealed this 3rd day of September 1974.

(SEAL)
Attest:

McCOY M. GIBSON, JR.
Attesting Officer

C. MARSHALL DANN
Commissioner of Patents